July 4, 1967   C. A. ALDRICH ETAL   3,329,528
TREATING NARROW PASSAGES WITH A FLUID
Filed April 19, 1963   2 Sheets-Sheet 1
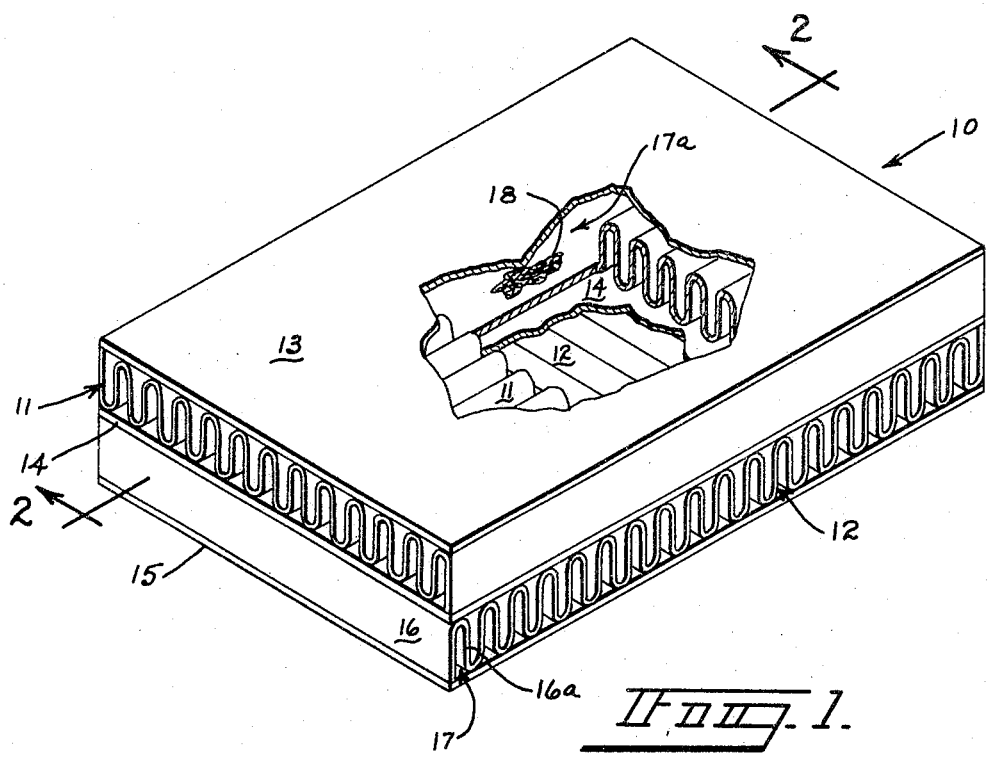
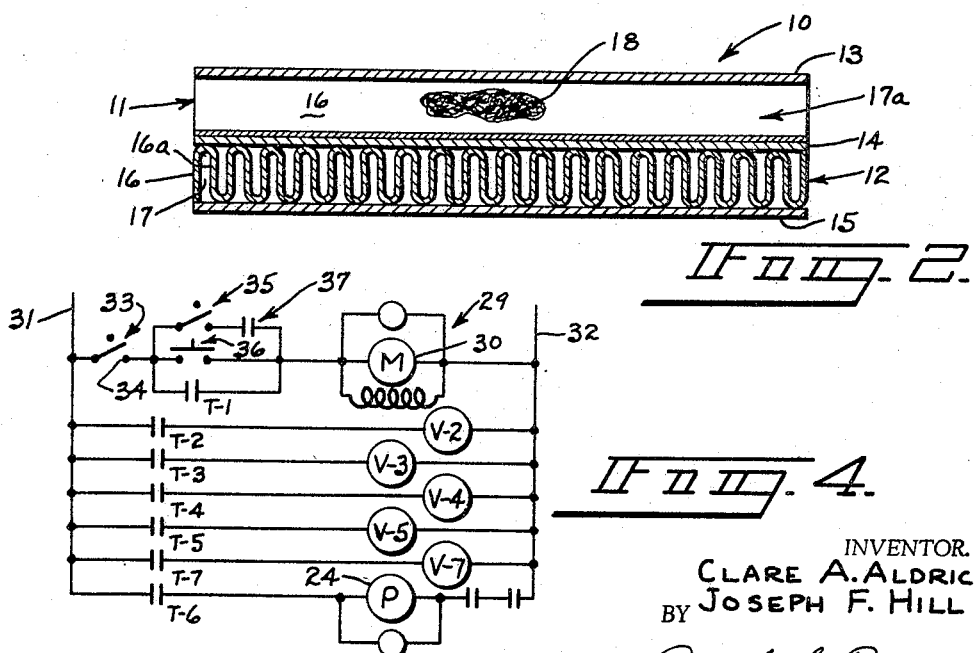
INVENTOR.
CLARE A. ALDRICH
BY JOSEPH F. HILL
Alfred L. Patmore, Jr.
ATTORNEY

… …

3,329,528
TREATING NARROW PASSAGES WITH A FLUID
Clare A. Aldrich, Thousand Oaks, and Joseph F. Hill, Rolling Hills Estates, Calif., assignors to Midland-Ross Corporation, Toledo, Ohio, a corporation of Ohio
Filed Apr. 19, 1963, Ser. No. 274,355
8 Claims. (Cl. 134—22)

This invention relates to a process for treating narrow passages, including closed end narow passages, for example, for removing flux deposits from the fine passageways of brazed heat exchangers, for removing soluble objects such as long, thin copper rods about which other materials may be formed, or which are used as cores in the casting or forming of an article, for applying coatings to adjacent walls, and the like.

The process of the invention particularly contemplates, in a specific embodiment, the removal of soluble materials which may be located deep within a passageway or hole of narrow cross-sectional configuration and of such depth as to render it extremely difficult and time consuming to flow a solvent into the passageway and to remove saturated solvent from the passageway. In another specific embodiment the process contemplates the application of a coating, e.g. of a silicone oil or of a metal, to walls defining such a narrow passageway or hole. For purposes of explanation of the process involving the invention, its use in the removal of brazing flux from the passageways of fine heat exchangers will be explained.

The present invention is particularly effective for cleaning heat exchangers which are assemblies of finned structures, such as finely corrugated sheet materials, and can be used, for example, to remove brazing flux from heat exchangers of this type having a "fin density" up to 100 fins per inch. The passageways between the fins of such exchangers are very small and, indeed, some may be blocked by the very materials sought to be removed, by excessive brazing, or even by the corrugating operation, so that they are closed at an interior point. To minimize corrosion in service it is essential to clean even the closed passages; in addition, the cleaning operation itself must be rapid to minimize corrosion during the course thereof.

Heat exchangers of this type usually are fabricated from brazable sheet material which is corrugated or otherwise formed to provide a multiplicity of narrow passages or spaces between consecutive corrugations. The corrugated metal is often thin gauge and, desirably, is so crimped as to provide, say, as many as about 100 individual fins per lineal inch. An assembly of several corrugated cores is usually unified by an overall brazing process. A brazing flux is required at the surfaces to be brazed together to accomplish such a process. After brazing, the flux often blocks the desired passages and hampers the effectiveness of the heat exchanger.

Attempts have been made to clear passages by submersion of such heat exchangers in a solvent. Submersion is not effective for several reasons. The passages are so small that contaminants are drawn thereinto with the brazing material by capillary force and the same capillary force seriously interferes with the passage of solvent into the passageways for the dissolution and removal of the contaminants. The immersion cleaning process may be speeded up by using hot water when soluble salts are to be removed, but this technique is so slow as to be impracticable when there are more than about 30 fins per inch, and is almost ineffective with blocked passages.

It is, therefore, an object of the present invention to provide a process for introducing a treating liquid into fine passageways and for subsequently removing the treating liquid.

It is a further object to provide a method for the removal of soluble material from the interior of fine passageways of considerable length and from the interior of blind or blocked passageways, such as the passageways normally encountered in heat exchangers having high fin densities.

It is still another object to provide a method for the removal of soluble material from a blind passage having a cross section so fine that capillary action of the solvent interferes with the flow thereof into the depths of the passage and also interferes with the removal of the saturated solution from the passages.

Other objects and advantages of the process embodying the instant invention will be better understood from the following specification and from the attached drawings, which illustrate a typical heat exchanger wherein the problem solved by the instant invention is encountered, and include time and flow charts illustrating how the method of the invention is carried out. In these drawings:

FIG. 1 is a view in perspective of a corrugated type heat exchanger, with parts broken away, and with the corrugations shown on an excessively enlarged scale to enable illustration of the problem encountered;

FIG. 2 is a vertical section along the line 2—2 of FIG. 1;

FIG. 4 is a wiring diagram illustrating the control of apparatus in performing the instant invention.

Figure 3:
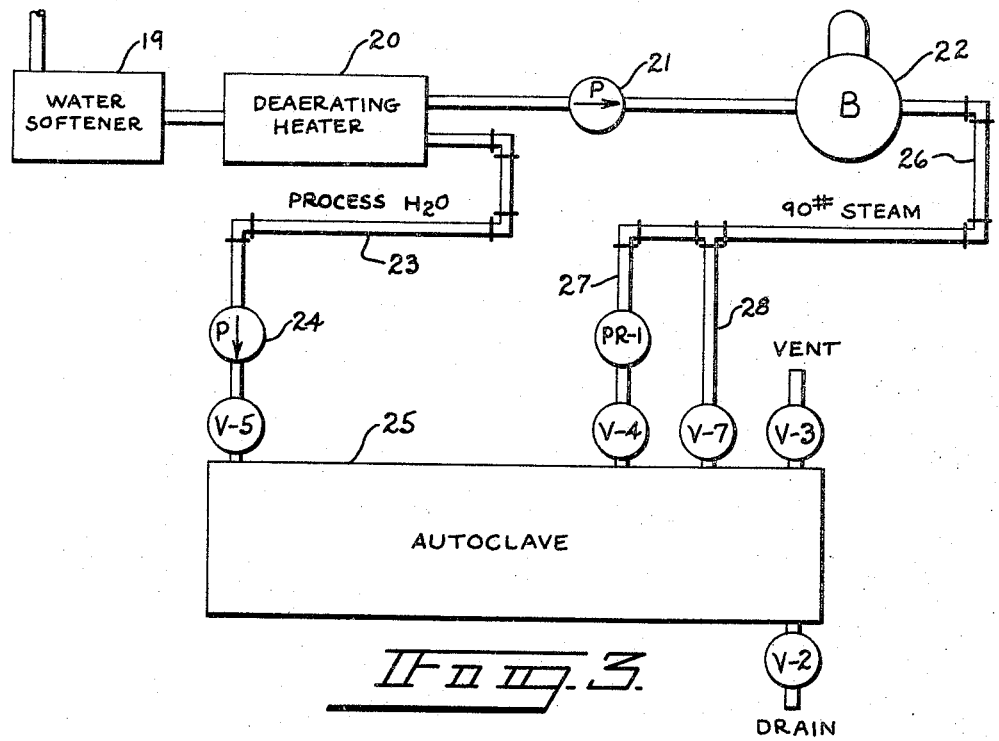
FIG. 3 is a diagrammatic flow chart illustrating apparatus which may be used for carrying out the instant invention.

A typical heat exchanger of the type wherein the problem solved by the instant invention is encountered may comprise a housing containing a plurality of adjacent passageways. Fluids at different temperatures may be passed through alternative sets of passageways to effect heat exchange therebetween. FIG. 1 is a simplified illustration of the core, generally indicated at 10, of such a heat exchanger. The core 10 is illustrated as comprising two separate sets of passageways, each formed by one of a pair of corrugated elements 11 and 12.

Each of the corrugated elements 11 and 12 as illustrated in FIGS. 1 and 2 may appear to have only three or four corrugations per lineal inch, but this is merely an illustrative showing. In actuality, of course, the problem encountered and overcome by the practice of the instant invention exists in such corrugated elements which are finely convoluted, for example to provide from about 30 to about 100 fins or passages per lineal inch. No limitation is to be imposed, therefore, by reason of the necessity for enlarging the corrugations and fins of the elements 11 and 12 in FIGS. 1 and 2 to illustrate the instant invention.

The heat exchanger core 10 also comprises border and separation plates 13, 14 and 15. The border plates 13 and 15 form the tops and bottoms, respectively, of passages extending from end to end of the core between the corrugations of the elements 11 and 12. The separation plate 14 forms the bottoms and tops, respectively, of the passages of the elements 11 and 12. For example, such a passageway extending between a fin 16 of the element 12 and the next adjacent fin 16a thereof is indicated by the reference number 17. Similar passageways, of course, extend throughout the two elements 11 and 12 and, for the most part, extend from end to end of the elements 11 and 12.

As is illustrated in both FIGS. 1 and 2 with respect to an individual passage 17a through the corrugated element 11, such a passage often is blocked by a deposit of salts from a brazing flux, such a deposit being generally shown by the mass indicated by the reference number 18. Also, as is indicated above, such blocking occurs as a consequence of the corrugating operation itself, particularly at fin density of 35 or higher.

In order to comprehend FIGS. 1 and 2 of the instant drawings as an illustration of the type of heat exchanger core in which the problem solved by the instant invention exists, it must be realized that each of the passages 17 or 17a extending between the fins 16 and 16a, for example, may have a cross section as little as $1/1000$ of a square inch or less depending upon the thickness of the "fins" 16 and 16a and other determinative factors in the construction of the heat exchanger core.

A typical heat exchanger core 10 is made from aluminum sheet material pre-coated with a brazing material which may consist of a high silicon aluminum alloy containing, for example, 7 to 13 percent silicon. Usually, each of the components, e.g., the corrugated elements 11 and 12, and the sheets 13, 14 and 15, is thoroughly cleaned by de-greasing, rinsing in dilute hydrofluoric acid, rinsing in cold water, rinsing in dilute nitric acid and re-rinsing in cold water. After such cleaning steps the components are assembled or stacked and then preheated to a temperature which may often be from 1000 to 1050° F. Distortion of the aluminum is minimized by avoiding rapid heating. The preheated assembly is then submerged in a molten salt brazing flux bath, which may be a conventional brazing flux and may be at a temperature of 1080 to 1140° F., for example. Conventional brazing fluxes comprise a combination of certain water soluble salts, for example the mixed chlorides and fluorides of lithium, sodium, potassium and aluminum, and they usually contain minor amounts of such impurities as silica and alumina.

The hot salt bath flows into the passages 17 formed by the fins 16 of the corrugated elements 11 and 12 and fluxes the surfaces of the high silicon aluminum alloy brazing material to cause brazing. After the brazing has been completed, the core is then lifted and suspended over the bath to allow the excess salt flux to drain from the passages 17. The core is then cooled and quenched.

It is the problem of freeing the core 10 of residual salt flux toward which the instant invention, in one aspect, is directed. It is necessary to remove the residual salt because it is extremely corrosive to the aluminum surfaces and would cause failure of the heat exchanger after but a short period of service, or even during a prolonged removal procedure. Conventionally, heat exchanger cores of this type are cleaned by dipping them into a tank of boiling hot water or by recirculating hot water through the assembled exchanger or through the core itself. Some attempts have been made to "fixture" the core, i.e., to couple liquid lines to its intake and discharge and to pump liquid solution through the heat exchanger to effect a cleaning. This is difficult not only because it is hard to maintain appropriate connections with the heat exchanger core, but also because the cores are of such varying sizes and types as to necessitate the employment of a substantial number of rather expensive fixtures for connecting a pressure and discharge line to opposite sides of the individual core elements. Furthermore, this method is not effective at cleaning blind passages which are completely blocked either by the residual flux or as a consequence of the corrugating operation.

The theoretical problem solved by this invention is that of dissolving a soluble material in a remote portion of a narrow passage in which a solvent becomes saturated with salt at the salt-solvent interface, and the solvent, due to the length of the passage has a concentration gradient extending to the opening to the passage where fresh, dilute solvent is easily maintained. In such a system, there is little driving force to disturb the concentration gradient in the narrow passage, hence there is no mechanism, other than diffusion for transporting the soluble material out of the passage.

By this invention, a mechanism is provided for periodically generating a gas at the soluble material-solvent interface and throughout the passage to push the solvent out of the passage, whereupon fresh solvent may be moved into the passage to dissolve additional soluble material.

The method of the instant invention, as applied to the removal of such salts, comprises, usually after a preliminary washing to remove exterior and easily dissolved salts, the steps of placing the core 10 in an autoclave and admitting rather low pressure steam, say at 25 p.s.i.g (265° F.) into the autoclave. Because of the relatively low surface tension of steam it readily penetrates the passages of core 10 at such a pressure. This drives off moisture in the core and carries away some of the salts which are readily attackable. It also acts to dispel air from the interior of the core and to evacuate air from the core. A quantity of water is then admitted into the autoclave at approximately the same pressure as the steam, i.e., at about 25 p.s.i.g., and preferably at a temperature sufficiently low to condense steam in the passages, e.g., at about 240° F. This water is added in order to provide an unsaturated solvent for the remaining salts in the core 10, and may be carried into the passages by capillary action or by virtue of a vacuum developed by the condensation of steam therein, or in both ways. As a consequence, the water is present against the faces of the salt deposits in the passages.

Next, steam under substantially higher pressure, say 90 p.s.i.g. (330° F.) is admitted into the autoclave. This initially compresses any air still present in the passages of the core 10 and condenses moisture out of the air so that the water in the passages is also under the same pressure. Subsequently, heating of the water within the passages may cause some flashing to steam, and a flushing action as a consequence.

After a period of time the autoclave is then vented to atmospheric pressure which causes at least some of the water trapped in the passages 17 to flash to steam, evacuating remaining water from the passages and carrying away the salts which have been dissolved therein.

Basically, the flashing step takes advantage of the change in volume between the gaseous and liquid phases to drive out a fluid from either a blind or an open passage. The phenomenon is based on the flashing of a portion of the liquid into vapor which occurs upon the reduction in pressure because the liquid had been in equilibrium with saturated or wet vapor. The flashed vapor pushes ahead of it the remaining liquid, thus driving the fluid out of the passage. The temperature is reduced as a consequence of the flashing. When the first steps of the cycle are then repeated, the fluid at high pressure is forced into the reduced pressure area within the core 10, and the vapors in the passages are pressurized, and cooled, and condense. The passages 17 contain steam after the venting step, so there is usually no need for the initial introduction of steam during repetition of the cycle. As a consequence of the condensation of steam, fresh liquid is brought to the interface where the dissolving action must take place.

The foregoing cycle is repeated with respect to any particular core a number of times determined by the quantity of salts which are deposited, the fineness of the passages being treated, the fin density and the size of the heat exchanger core relative to the quantity of solvent present in the autoclave.

Apparatus for carrying out the above briefly described method of the invention is illustrated in FIG. 3 and comprises, among other necessary control parts, a water softener 19 coupled to a de-aerating heater 20. The de-aerating heater is connected through a pump 21 to a boiler 22. The de-aerating heater 20 is also connected by a line 23 to a pump 24 and through a valve V–5 to an autoclave 25. A 90 pound steam line 26 leads from the boiler 22 and is divided into two lines 27 and 28. The steam line 27 leads to a pressure reducer designated as PR–1 where its pressure is reduced to, say, 25 p.s.i.g. and then through a valve V–4 to the autoclave 25. The line 28 is connected to the autoclave 25 by a valve V–7. The autoclave 25 is vented to atmosphere through a vent valve V–3.

Figure 5:
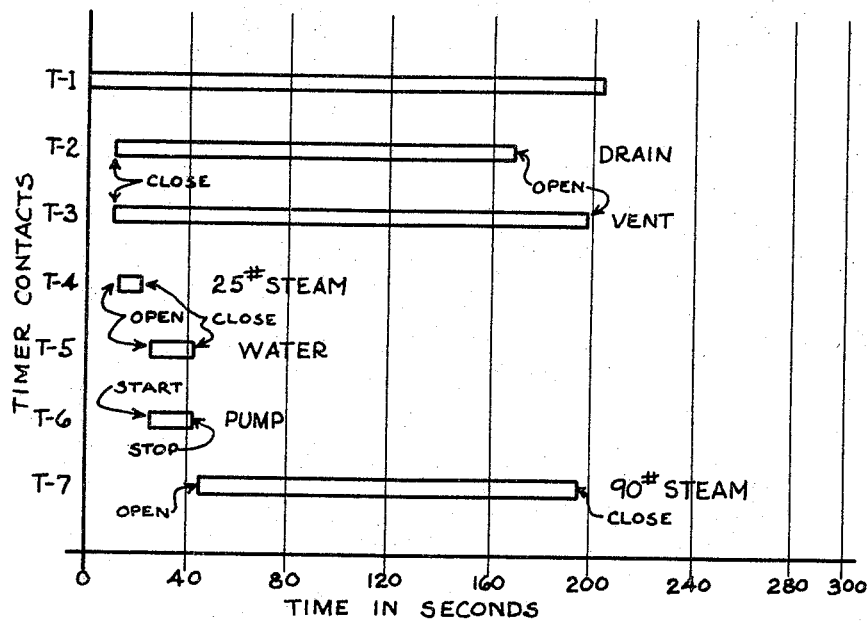
FIG. 5 is a time chart related to the wiring diagram of FIG. 4 and the flow chart of FIG. 3 and illustrating the method embodying the invention.

Referring now to FIGS. 4 and 5 the apparatus illustrated in FIG. 3 and just described is controlled by control apparatus illustrated in FIG. 4 which is based upon a timer generally indicated by the reference number 29. The timer 29 has a motor 30 connected between control lines 31 and 32 through a stop switch 33 having a reset contact 34 and through a three branch parallel circuit including a repeat cycle switch 35, a start switch 36 and timer controlled contacts T–1. The repeat cycle switch 35 is also in series with timer repeat cycle contacts 37.

To initiate a single cycle, the reset switch 33 is set at the reset position closing the reset contact 34 and the start switch 36 is also closed. This energizes the motor 30 of the timer 29 and starts its shaft rotating to rotate its several cams which control the timer contact T–1 as a holding circuit for the timer 29. The several timer contact cams also control timer contacts T–2 through T–7, inclusive.

Referring to FIG. 5 it will be observed that as soon as the timer motor starts turning the contacts T–1 are closed and remain closed throughout an entire cycle illustrated as taking approximately 205 seconds to complete. After the timer has run for approximately 10 seconds its contacts T–2 are closed to energize a valve V–2 in a drain pipe leading from the autoclave 25 (see FIG. 3). The drain valve is held closed by the contacts T–2 until near the end of a cycle. At the same time the vent valve V–3 is energized by the closing of the contacts T–3 so that the autoclave is thus closed off from atmosphere and its drain is also closed. Shortly thereafter contacts T–4 are opened to admit 25 pound steam through the valve V–4 and the pressure reducer PR–1 from the steam line 27. The steam valve V–4 remains open until about 22 seconds of the cycle have passed, thus insuring the filling of the autoclave with steam under this pressure. The contacts T–4 then open causing the valve V–4 to close. Immediately after the 25 pound steam valve V–4 is closed, the contacts T–5 and T–6 are closed to open the water valve V–5 and to start the process water pump 24 to pump process water from the de-aerating heater 20 into the autoclave 25. Both the water control valve V–5 and the pump 24 continue in this condition for a period of some 20 seconds so that a measured quantity of process water at about 240° F., as mentioned above, is pumped into the autoclave 25. The contacts T–5 and T–6 are then shifted by their respective timer cams to close the water valve V–5 and stop the energization of the motor of the pump 24. Immediately thereafter, about 45 seconds after the beginning of the cycle, the timer contacts T–7 are actuated by the respective timer cam to open the 90 pound steam valve V–7 to feed steam under 90 p.s.i.g. into the autoclave 25.

Continuing the examination of FIG. 5 further, it will be noted that the drain valve V–2 is opened at about 170 seconds and the vent valve V–3 suddenly opened at about 195 seconds with the high pressure steam valve T–7 being closed at that same time. This brings about the "flashing" discussed above which discharges water and salts dissolved therein from the narrow passageways into which it has been forced by the several steps of the process. If the particular core 10 being cleaned is one which requires repetitive cycles to effect its cleaning, the operator has initially closed the repeat cycle switch 35. In this case, upon completion of a cycle and dropping out of the timer contacts T–1, the repeat cycle contacts 37 are momentarily closed to re-energize the timer motor and to re-establish the holding control of the timer contacts T–1, so that the cycle automatically repeats itself. If desired, a cycle counter may be interposed in the line controlled by the timer repeat contacts 37 so as to prevent restarting of the timer after a predetermined number of cycles have been completed.

Although the specific embodiment of the invention has been discussed in connection with the use of steam and then liquid water at 25 p.s.i.g., followed by steam at 90 p.s.i.g., it will be understood that considerable latitude is possible in practicing the method of the invention. For example, the pressure of the steam initially introduced into the pressure vessel can be varied within relatively broad limits, for example from about 10 to about 50 p.s.i.g., or this step can be omitted altogether in some cases, particularly during second and subsequent cycles when the passages contain steam. The dissolution of salts is considerably faster during a first cycle when a preliminary introduction of steam is used. The liquid water can also be introduced into the vessel at any of a number of temperatures and pressures. Obviously, if the first step of introducing steam is employed, the liquid water must be introduced at a pressure at least as high as that prevailing in the vessel at the time of the water introduction. Furthermore, the water must be introduced at a temperature, preferably above ambient, such that at least enough of the water remains in the liquid phase to cover the passageways from which salts must be dissolved. The temperature, therefore, must be sufficiently low that enough of the water to cover the passageways remains in the liquid phase at the pressure which prevails in the vessel after the water introduction. Preferably, the water should be at a temperature sufficiently low to cause condensation of steam in the passages and a consequent vacuum to aid in introducing water thereinto. Satisfactory results have been achieved when the pressure in the vessel ranged from about 10 to about 50 p.s.i.g. after introduction of the liquid water. After the final introduction of steam into the vessel the pressure and temperature must be such that flashing of liquid water in the minute passageways will occur upon venting of the vessel to atmospheric pressure. In general, the final steam introduction should be at a pressure higher than that which previously prevailed within the vessel, but should not be sufficiently high to cause distortion of the heat exchanger either upon introduction of the steam or upon flashing when the vessel is vented. Satisfactory results have been achieved when the final steam was introduced at pressures ranging from about 50 p.s.i.g. to about 150 p.s.i.g. The steam used in practicing the method of the instant invention can be wet, saturated or superheated. Under special circumstances the final venting may be to a vacuum. Such a procedure is advantageous, for example, when the removal of salts of reverse solubility is desired, or when high processing temperatures are undesirable for some other reason.

The method can also be used to remove soluble deposits other than salts from small passages in heat exchangers or other bodies or for applying various coatings to walls which define small passages. For example, in various organic chemical processing techniques heat exchangers and other pieces of apparatus having small passages are frequently employed, and may require cleaning, for example, if solid deposits form during normal processing or if solid deposits form as a consequence of a processing error. In such a situation, a solvent other than water is normally required for removal of the deposits, and the pressures and temperatures required will differ substantially from those which have been set forth above. However, the general considerations will be the same: enough of the liquid solvent must remain in the liquid phase at the temperature which prevails within the exchanger that the passageways to be cleaned are immersed therein; a vacuum is preferably developed within the passages upon introduction of the liquid solvent; and the pressure and temperature of the liquid solvent within the passages must be such that flashing as discussed above occurs upon venting of the pressure vessel. The liquid and vapor phase solvents need not be identical, although, particularly in the case where water is used to remove soluble salts, such is usually a preferred mode of operation. Also, solvents other than water, e.g., aqueous acid solutions, can be used with steam or other vapor phase materials in practicing various embodiments of the invention.

The method of the instant invention is also peculiarly adapted for the application of coatings, for example, of metal by chemical plating, e.g., by the electroless plating of nickel and cobalt, or of silicones or other protective materials, on surfaces defining small passageways. Electroless plating involves the catalytic deposition of such metals as nickel and cobalt from a suitable solution, and is disclosed in detail in U.S. Patents 2,532,283 and 2,532,284, and is discussed thoroughly in A.S.T.M. Special Technical Publication No. 265, November 1959, under the title "Symposium on Electroless Nickel Plating." For chemical plating generally, and electroless plating of nickel or cobalt specifically, it is necessary to bring a suitable solution into contact with a surface to be plated, and to maintain such solution within certain limits relative to concentration of solutes. Chemical plating of minute passageways is extremely difficult by previously known techniques because of the difficulties involved both in forcing the plating bath into the passageways and in replenishing the solutes in the bath within the passageways. The instant invention provides an easy way to force the bath into minute passageways to accomplish plating, and also provides an easy flashing technique for eliminating spent plating bath therefrom.

Various changes and modifications from the specific details shown in the accompanying drawings and hereinbefore described will be apparent to one skilled in the art, and can be made without departing from the spirit and scope of the invention as defined in the appended claims.

We claim:
1. A method for removing water soluble salts from a plurality of small passageways in a heat exchanger comprising, in combination: placing said heat exchanger in a closed pressure vessel; introducing a quantity of steam into said vessel at a pressure greater than atmospheric and at a temperature above that of boiling at such pressure; introducing a quantity of liquid water into said vessel, at a pressure greater than atmospheric, at a temperature less than that of boiling at such pressure, and to a depth in said vessel sufficient to flood said passageways; introducing steam into said vessel at a substantially higher pressure and at a temperature such that the resulting temperature of the liquid water and steam in said vessel is higher than the boiling point of liquid water at atmospheric pressure; and venting said vessel to atmospheric pressure, whereby the flash change in volume between the liquid water in said passageways and steam drives the liquid water from said passageways; and repeating the aforesaid steps of introducing a quantity of liquid water into said vessel, introducing steam into said vessel at a substantially higher pressure, and venting said vessel to atmospheric pressure, until substantially all of the salts are removed from the passageways.

2. A method for removing soluble material from a small passageway in a body comprising, in combination: placing said body in a closed pressure vessel; introducing a quantity of a first vapor into said vessel, at a pressure greater than atmospheric and at a temperature above that of boiling at such pressure; introducing a quantity of a liquid solvent into said vessel, at a pressure greater than atmospheric, at a temperature less than that of boiling at such pressure, and to a depth in said vessel sufficient to flood said passageway; introducing a quantity of a second vapor into said vessel at a substantially higher pressure and at a temperature such that the resulting temperature of the liquid and gas in said vessel is higher than the boiling point of said liquid solvent at atmospheric pressure; and venting said vessel to atmospheric pressure, whereby the flash change in volume between the liquid in said passageway and its vapor phase drives the liquid solvent from said passageway.

3. The method according to claim 2 wherein the first and second vapors are of the same composition.

4. The method according to claim 3 wherein the first and second vapors comprise steam.

5. The method according to claim 4 wherein the liquid solvent comprises water.

6. The method according to claim 5 wherein the liquid comprises an aqueous solution.

7. A method for removing water soluble salts from a plurality of small passageways in a heat exchanger comprising, in combination: placing said heat exchanger in a closed pressure vessel; introducing a quantity of steam into said vessel, at a given pressure from about 10 to about 50 p.s.i.g. and at a temperature above that of boiling at such pressure; introducing into said vessel, while maintaining therein a pressure at least substantially as high as the given pressure, a quantity of liquid water at a temperature less than that of boiling at the given pressure, and to a depth in said vessel sufficient to flood said passageways; introducing steam into said vessel at a pressure from about 50 to about 150 p.s.i.g. that is substantially higher than the given pressure and at a temperature such that the resulting temperature of the liquid water and steam in said vessel is higher than the boiling point of liquid water at atmospheric pressure; and venting said vessel to atmospheric pressure, whereby the flash change in volume between the liquid water in said passageways and steam drives the liquid water from said passageways; and repeating the aforesaid steps of introducing a quantity of liquid water into said vessel, introducing steam into said vessel at a higher pressure, and venting said vessel to atmospheric pressure until substantially all of the salts are removed from the passageways.

8. A method for removing water soluble salts from a plurality of small passageways in a heat exchanger comprising, in combination: placing said heat exchanger in a closed pressure vessel; introducing a quantity of steam into said vessel, at a pressure of about 25 p.s.i.g.; introducing into said vessel, while maintaining therein a pressure of at least substantially 25 p.s.i.g., a quantity of liquid water at a temperature less than that of boiling at 25 p.s.i.g., and to a depth in said vessel sufficient to flood said passageways; introducing steam into said vessel at a higher pressure of about 90 p.s.i.g. and at a temperature such that the resulting temperature of the liquid water and steam in said vessel is higher than the boiling point of liquid water at atmospheric pressure; and venting said vessel to atmospheric pressure, whereby the flash change in volume between the liquid water in said passageways and steam drives the liquid water from said passageways; and repeating the aforesaid steps of introducing a quantity of liquid water into said vessel, introducing steam into said vessel at a higher pressure, and venting said vessel to atmospheric pressure, until substantially all of the salts are removed from the passageways.

References Cited

UNITED STATES PATENTS

| | | | |
|---|---|---|---|
| 2,089,317 | 8/1937 | Wilder | 134—17 |
| 2,597,896 | 5/1952 | Oster | 134—22 |
| 2,669,531 | 2/1954 | Petkus | 134—22 X |

MORRIS O. WOLK, *Primary Examiner.*

J. SCOVRONEK, *Assistant Examiner.*